Sept. 5, 1933.     A. F. KERN     1,925,488

METAL FASTENER

Filed Aug. 29, 1932

A. F. Kern
Inventor

By C. A. Snow & Co.
Attorneys

Patented Sept. 5, 1933

1,925,488

UNITED STATES PATENT OFFICE 1,925,488

METAL FASTENER

Albert Fred Kern, San Francisco, Calif.

Application August 29, 1932. Serial No. 630,979

4 Claims. (Cl. 256—54)

This invention relates to a fastening device designed primarily for use in securing wire fencing to its posts, the construction of the fastener being such that the fastener may be positioned by striking the fastener a blow with a hammer or similar tool after it has been placed within an opening formed in the post, eliminating the use of pliers, or other tools, in the application of the fastener.

An important object of the invention is to so construct a fastening device that it will have contacts that bear on the surface of the supporting member, causing the end portions of the fastener to act as levers for forcing the lugs apart to engage the back of the ends of the slots of the supporting member.

Another important object of the invention is to provide a fastener for fastening wires of various sizes, the construction of the fastener being such that the fastener may be used to either grip the wire or merely embrace the wire, thereby acting as a guide.

A still further object of the invention is to provide a fastener that may be effectively employed for security plates of sheet material, together.

Another object of the invention is to construct the fastener of inert material to the end that the fastener automatically spreads when the fastener is subjected to pressure or a blow at the center thereof.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
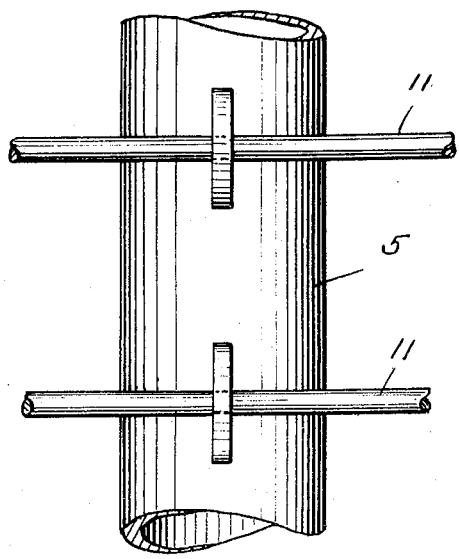
Figure 1 is a fragmental elevational view of a post showing fence wires secured by the fastener constructed in accordance with the invention.

Referring to the drawing in detail, the reference character 5 designates a portion of a post with which the fastener is used, the post being tubular in formation, and provided with aligning openings for the reception of the fastening device.

The openings, which are indicated by the reference character 6, are elongated and are so constructed that they will accommodate the fingers 7, that have laterally extended end portions 8.

Figure 2:
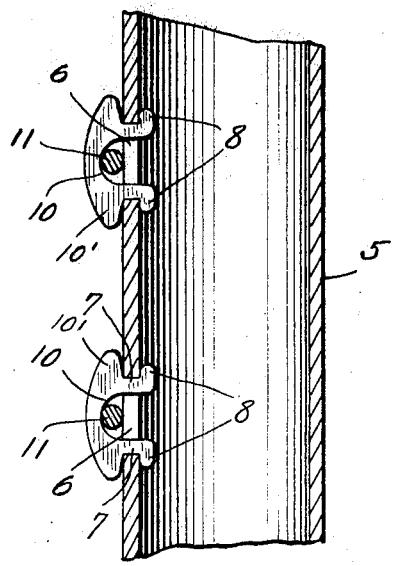
Figure 2 is a longitudinal sectional view through a portion of a post, with the fastener applied.

The fastener is provided with lateral cut out portions 9, that accommodate portions of the post adjacent to the openings, so that when the fasteners are positioned, the walls of the cut out portions 9 will engage the post, in a manner as shown by Figure 2 of the drawing.

Figure 3:
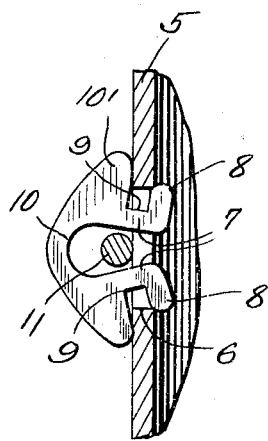
Figure 3 is a fragmental sectional view illustrating the fastener as placed in an opening of a fence post, prior to the seating of the fastener.

These cut out portions 9 also provide enlarged ears 10' that rest against the outer surface of the post, in a manner as shown by Figure 3 of the drawing, when the fastening member is positioned, and prior to the fastening member being struck a blow to seat the same. These ears 10' are so formed that they slide over the outer surface of the post, causing the fingers to move apart and grip the walls of the slots.

In the construction of the fastener, the fastener is formed with a central cut out portion 10 for the reception of fence wire, which is indicated at 11.

It might be further stated that the fasteners may be stamped from sheet metal material and formed in such a way that the fingers 7 are disposed towards each other, and that the central portion of the outer surface of each fastener is slightly bulged which when struck a blow with a hammer or similar tool, flattens to a degree, spreading the fingers into engagement with the post, and at the same time causing the fasteners to engage the fence wire.

Figure 4:
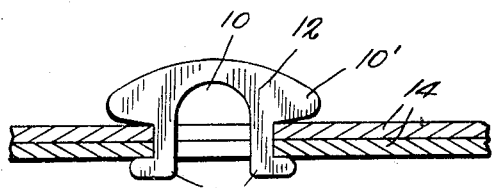
Figure 4 is a fragmental sectional view illustrating the fastener as employed as a means for securing metallic plates together.
Figure 5:
Figure 5 is a view illustrating a fastener constructed of wire material.

As shown by Figure 4 of the drawing, the fastener which is indicated by the reference character 12 is provided with fingers 13 that have their outer surfaces cut away to receive the plates 14, which are secured together by the fastener.

In the form of the invention as shown by Figure 4 of the drawing, the fastener is shown as constructed of heavy wire material and formed in such a way that the outer surface thereof is bulged to the end that the fingers 15 will spread laterally into engagement with the article, with which the fastener is used, when the fastener is struck on the outer curved surface thereof.

From the foregoing it will be seen that due to the construction shown and described, and due to the fact that the fasteners are made of inert material, they will be retained in their gripping position after they have been struck a blow at the center of the bulged portion thereof, and that the action of the fastener does not in any way rely on the spring action of the metal of which it is constructed.

Having thus described the invention what is claimed is:

1. A fastener comprising in combination, a supporting member having openings, a body portion formed with a central cut out portion defining spaced gripping fingers, said fingers having cut out portions in the outer edges thereof to fit over the edges of the opening in which the body portion is positioned, when the body portion is struck a blow to drive the body portion into the opening.

2. The combination with a supporting member having an opening, of a fastener comprising a body portion, spaced fingers on the body portion, lugs formed at the outer ends of the fingers, ears disposed adjacent to the lugs and resting on the surface of the supporting member providing levers, said ears moving over the supporting member forcing the lugs against the supporting member when the body portion is struck a blow to position the body portion.

3. A fastener comprising in combination, a supporting member having openings, a body portion, spaced gripping fingers extending from the body portion, and means on the outer edges of the gripping fingers and cooperating with the supporting member for moving the fingers laterally into gripping relation with the walls of the opening in which the fingers are positioned, when the body portion is struck a blow to drive the body portion into the opening.

4. A fastener comprising in combination a supporting member having openings, a body portion, spaced gripping fingers extending from the body portion, the free ends of the fingers normally extending towards each other, laterally extended lugs formed on the outer edges of the fingers and disposed at the free ends of the fingers, ears extending laterally from the body portion and spaced from the lugs, said body portion being bulged and the ears engaging the supporting member to spread the free ends of the fingers laterally within the opening in which the fingers are positioned when the fastener is struck a blow on the bulged portion thereof.

ALBERT FRED KERN.